United States Patent
Iwai (10) Patent No.: US 9,428,151 B2
(45) Date of Patent: Aug. 30, 2016

(54) VEHICLE MONITORING SYSTEM

(71) Applicant: HONDA ACCESS CORP., Niiza-shi, Saitama (JP)

(72) Inventor: Shiro Iwai, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 0 days.

(21) Appl. No.: 14/426,849

(22) PCT Filed: Sep. 4, 2013

(86) PCT No.: PCT/JP2013/073763
§ 371 (c)(1),
(2) Date: Mar. 10, 2015

(87) PCT Pub. No.: WO2014/038575
PCT Pub. Date: Mar. 13, 2014

(65) Prior Publication Data
US 2015/0217728 A1 Aug. 6, 2015

(30) Foreign Application Priority Data

Sep. 10, 2012 (JP) .................. 2012-198146

(51) Int. Cl.
*G05D 1/00* (2006.01)
*B60R 25/30* (2013.01)
(Continued)

(52) U.S. Cl.
CPC ....... *B60R 25/305* (2013.01); *G08B 13/19647* (2013.01); *G08B 13/1654* (2013.01); *G08B 13/1672* (2013.01)

(58) Field of Classification Search
CPC .................. G06Q 10/0631; G06Q 10/06311; H04L 67/12

USPC ...... 701/31.4, 1, 2, 31.6, 70, 29.1, 484, 517; 340/459, 937
See application file for complete search history.

(56) References Cited

U.S. PATENT DOCUMENTS

2011/0093306 A1* 4/2011 Nielsen .............. G06Q 10/0631
705/7.13

FOREIGN PATENT DOCUMENTS

JP 10-315917 A 12/1998
JP 10315917 A * 12/1998
(Continued)

OTHER PUBLICATIONS

Notification of Transmittal of Translation of the International Preliminary Report on Patentability (Chapter I or Chapter II) (Form PCT/IB/338) of international Application No. PCT/JP2013/073763 mailed Mar. 19, 2015 with forms PCT/IB/373 and PCT/ISA/237, (7 pages).

(Continued)

*Primary Examiner* — Gertrude Arthur Jeanglaud
(74) *Attorney, Agent, or Firm* — Westerman, Hattori, Daniels & Adrian, LLP (57) ABSTRACT

Provided is a system capable of reducing production costs. The system (on-board device) comprises an acquisition unit provided in a vehicle and comprising a camera unit that captures images and/or a microphone unit that captures sound; and an error detection unit that detects vehicle errors. The system sends the acquisition results from the acquisition unit, such as images and sound, to outside the vehicle in conjunction with a mobile information terminal provided in the vehicle, when the error detection unit has detected an error. Ideally, the mobile information terminal has a rechargeable battery unit and the acquisition unit and/or the error detection unit have power supplied thereto from the battery unit in the mobile information terminal, and can operate thereby. Also, the error detection unit ideally changes the error detection mode in accordance with the state of the battery unit in the mobile information terminal.

17 Claims, 6 Drawing Sheets

(51) Int. Cl.
*G08B 13/196* (2006.01)
*G08B 13/16* (2006.01)

(56) References Cited

FOREIGN PATENT DOCUMENTS

| JP | 11-328545 A | | 11/1999 |
|---|---|---|---|
| JP | 11328545 A | * | 11/1999 |
| JP | 2004-362159 A | | 12/2004 |
| JP | 2005-311995 A | | 11/2005 |
| JP | 2005311995 | * | 11/2005 |
| JP | 2010-208382 A | | 9/2010 |
| JP | 2011-192308 A | | 9/2011 |
| JP | 2012-66648 A | | 4/2012 |
| JP | 2012066648 A | * | 4/2012 |

OTHER PUBLICATIONS

International Search Report dated Oct. 29, 2013 issued in corresponding application No. PCT/JP2013/073763.

Office Action dated Jun. 21, 2016, issued in counterpart Japanese Patent Application No. 2014-534380, with English translation. (6 pages).

* cited by examiner

VEHICLE MONITORING SYSTEM

TECHNICAL FIELD

The present invention relates to a vehicle monitoring system, and particularly to a system wherein vehicle errors such as theft are detected and the detection results are sent from a mobile information terminal such as a mobile telephone terminal.

BACKGROUND ART

For example, the drawings in Patent Literature 1 disclose a vehicle security system comprising components such as an image transmission device and a wireless communication device, and according to the description of Patent Literature 1, the image transmission device has the same function as an image transmission device commonly used in a security system for issuing an alert, in the form of an image captured by a camera, e.g., when an error has been detected, to a security center of a security company through a telephone line or the like.

Because the image transmission device of Patent Literature 1 is used in a security system, the wireless communication device of Patent Literature 1 is also used in a security system. In other words, the wireless communication device is constructed from a specialized implement for issuing an alert to a center device disclosed in, for example, the drawings of Patent Literature 1, and the costs for producing the vehicle security system comprising components such as the image transmission device and the wireless communication device therefore increase. The costs for operating the center device increase as well.

PRIOR ART LITERATURE

Patent Literature

Patent Literature 1: JP-A H11-328545

SUMMARY OF INVENTION

An object of the present invention is to provide a system whereby production costs can be reduced. Other objects of the present invention would become clear to a person skilled in the art from referring to the aspects and preferred embodiments exemplified below, as well as the accompanying drawings.

For readily understanding of the summary of the present invention, explanation will be given below as to certain preferred embodiments of the present invention. According to a first aspect of the present invention, there is provided a vehicle monitoring system, which comprises: an acquisition unit for acquiring images and/or sound, the acquisition unit being provided in the vehicle; and an error detection unit for detecting errors in the vehicle, the error detection unit being provided in the vehicle; the acquisition results outputted from the acquisition unit being sent outside the vehicle in conjunction with a mobile information terminal provided in the vehicle when the error detection unit has detected an error.

The vehicle monitoring system can utilize the mobile information terminal provided in the vehicle. In other words, the mobile information terminal does not need to be constructed from a specialized implement, and can be constructed from a general-purpose implement. Therefore, the system can utilize, for example, a mobile information terminal owned by a user, and the costs for producing the system can be reduced.

Preferably, the mobile information terminal has a rechargeable battery; and the acquisition unit and/or the error detection unit are powered by the battery unit of the mobile information terminal and allowed to operate.

The acquisition unit and/or the error detection unit of the system is powered by the battery unit of the mobile information terminal. Therefore, the system does not need to convert the on-board battery power source (e.g. 12 [V]) to the drive power source (e.g. 5 [V]) of components such as the error detection unit, and the costs for producing the system are thereby reduced.

Preferably, the error detection unit changes the error detection mode in accordance with the state of the battery unit in the mobile information terminal.

When, for example, the remaining life of the battery unit is low, the error detection unit can change the error detection mode to continue error detection for a long time.

Preferably, the battery unit can be recharged using power from an on-board battery.

Because the battery unit of the mobile information terminal can be recharged with the use of power from an on-board battery, the user does not need to take the mobile information terminal to, for example, the user's home to recharge the battery unit.

Preferably, the acquisition unit and/or the error detection unit are powered by the on-board battery in accordance with the state of the on-board battery and allowed to operate.

The acquisition unit can operate when, for example, the remaining life of the on-board battery is a predetermined value or greater. Similarly, the error detection unit can also operate in accordance with the state of the on-board battery. Situations in which a drive unit such as the engine of the vehicle cannot be started up are thereby avoided or reduced.

Preferably, the system is one in which the error detection unit synchronizes a sensor unit of the mobile information terminal with a sensor unit of the on-board device to detect the errors.

Because the sensor unit of the mobile information terminal is synchronized with the sensor unit of the on-board device, the error detection unit can analyze errors in the vehicle in detail.

Preferably, the system further comprises: the mobile information terminal.

The mobile information terminal of the system can communicate with, for example, another mobile information terminal, and the system therefore can send the acquisition results of the acquisition unit to outside the vehicle. The costs of producing the mobile information terminal are low, and the costs for producing the system are therefore also reduced.

Preferably, the system further comprises: a mobile information terminal for receiving the acquisition results sent from the mobile information terminal.

The user can receive acquisition results such as images and sound through the other mobile information terminal. In other words, the user can monitor the vehicle him or herself via the acquisition results, and the costs of operating the, for example, center device of the vehicle security system of Patent Literature 1 are therefore unnecessary.

A person skilled in the art could easily understand that the exemplified aspects according to the present invention can be further changed without deviating from the spirit of the present invention.

BRIEF DESCRIPTION OF DRAWINGS

FIG. 7(A) shows an example of the placement of the on-board device and the mobile information terminal of FIG. 5, FIGS. 7(B) and 7(C) show examples of output about one axis of gyro sensors of the on-board device and the mobile information terminal, respectively, and FIGS. 7(D) and 7(E) show examples of output about another axis of gyro sensors of the on-board device and the mobile information terminal, respectively.

DESCRIPTION OF EMBODIMENTS

Certain preferred embodiments described below are used in order to make the present invention easy to understand. Therefore, persons skilled in the art should take into consideration that the present invention is not improperly limited by the embodiments described below.

Figure 1:
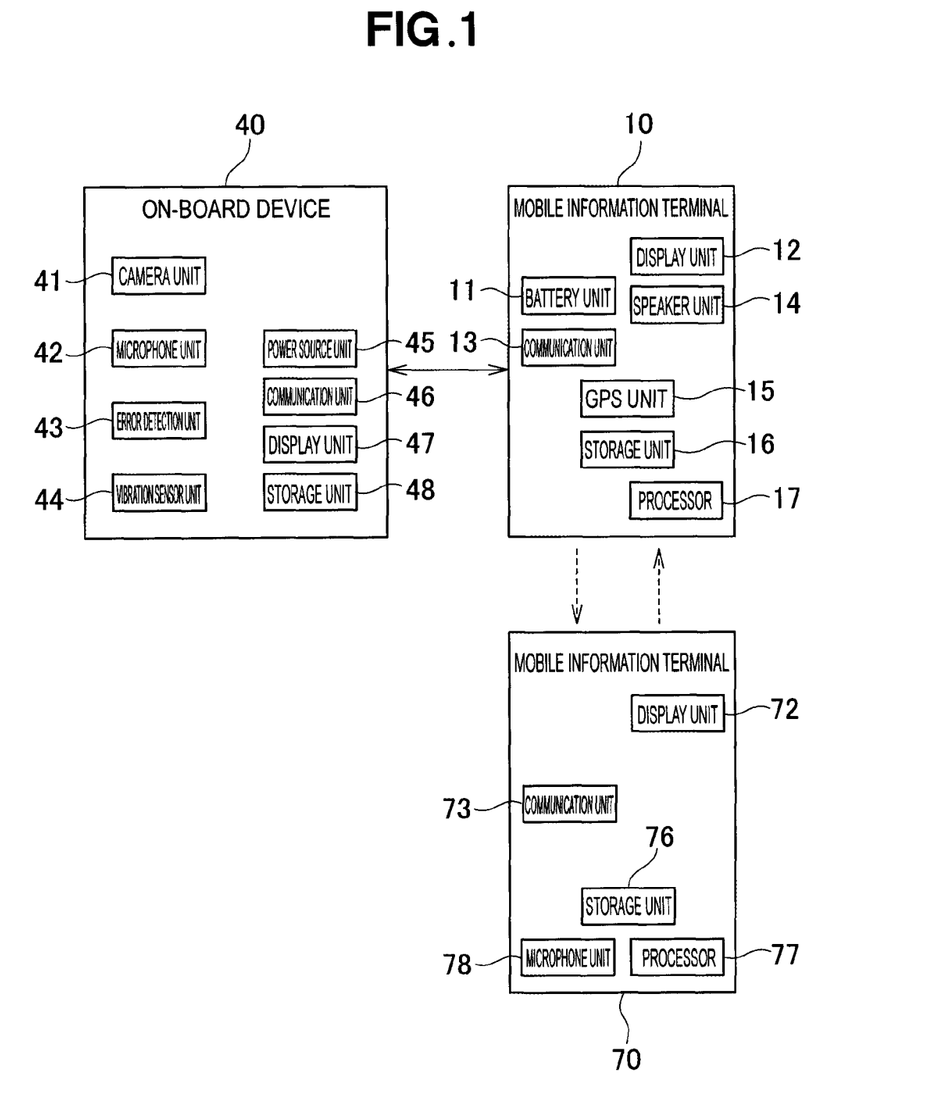
FIG. 1 shows an example configuration of a system according to the present invention.

FIG. 1 shows an example of the configuration of a system according to the present invention. In the example of FIG. 1, the vehicle monitoring system comprises, for example, an on-board device 40 (a monitoring device), it being an object of the system to monitor vehicle errors such as theft or vandalism (or sources of such errors). In other words, the system comprises at least the on-board device 40 (or acquisition units such as a camera unit 41 and a microphone unit 42, and an error detection unit 43), and can also comprise a mobile information terminal 10 provided to a vehicle such as, e.g., an automobile. The system may further comprise a mobile information terminal 70 capable of communicating with the mobile information terminal 10.

The system or on-board device 40 shown in FIG. 1 comprises the camera unit 41 and the microphone unit 42 as acquisition units, and the camera unit 41, which is provided in the vehicle, acquires images. The microphone unit 42, which is provided in the vehicle, acquires sound. The on-board device 40 need not comprise both the camera unit 41 and the microphone unit 42, and may comprise only the camera unit 41 or only the microphone unit 42. The system or the on-board device 40 further comprises the error detection unit 43, and the error detection unit 43, which is provided in the vehicle, detects errors in the vehicle. When the error detection unit 43 has detected an error in the vehicle, the system or the on-board device 40 sends the acquisition results from the acquisition units (preferably both images and sound) to outside the vehicle in conjunction with the mobile information terminal 10 provided in the vehicle.

The system or the on-board device 40 can utilize the mobile information terminal 10 provided in the vehicle. In other words, the mobile information terminal 10 need not be constructed from a specialized implement, and can be constructed from a general-purpose implement. Therefore, the costs for producing the system or the on-board device 40 can be reduced because the system or the on-board device 40 can utilize, e.g., a mobile information terminal which is owned by the user.

The growth in ownership of mobile telephone terminals has been extremely high of late, with most users owning at least one mobile telephone terminal. It is not uncommon for a single user to own multiple mobile telephone terminals. A mobile information terminal 70 can be constructed with the primarily used mobile telephone terminal from among multiple mobile telephone terminals, and a mobile information terminal 10 can be constructed from the remaining mobile telephone terminals. The mobile information terminal 10 and the mobile information terminal 70 here are both preferably general-purpose mobile telephone terminals (e.g. "smartphones" or the like), and may be mobile computers (e.g. mobile tablet personal computers, mobile personal digital assistants (PDAs), or the like) that can connected to a mobile telephone network. The costs for producing the mobile information terminals 10, 70 constructed from general-purpose implements is commonly low, and the costs for producing the system comprising the mobile information terminals 10, 70 are therefore reduced. The vehicle can be monitored by users themselves or by the mobile information terminal 70 via the acquisition results, and the operational cost of, for example, the center device side in the vehicle security system of Patent Literature 1 is therefore rendered unnecessary or reduced.

Figure 2:
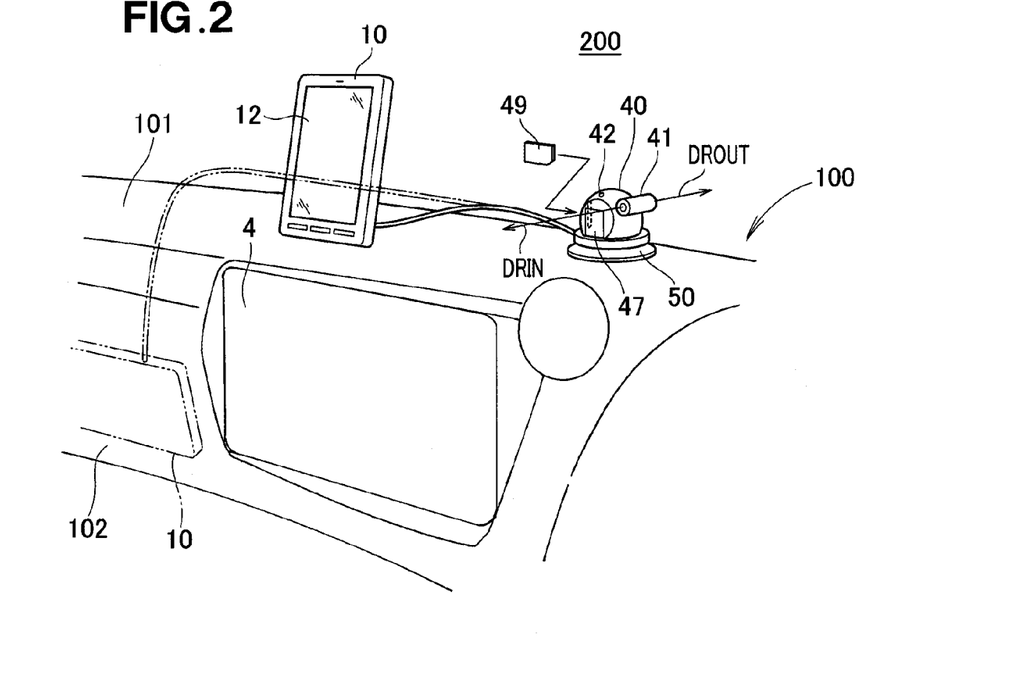
FIG. 2 shows an example external appearance of the on-board device and the mobile information terminal of FIG. 1.

FIG. 2 shows an example of an external view of the on-board device and a mobile information terminal (the vehicle-side mobile information terminal) shown in FIG. 1. The on-board device 40 and the mobile information terminal 10 shown in FIG. 2 are provided in the vehicle 200; specifically, the on-board device 40 and the mobile information terminal 10 are provided in, for example, the dashboard (instrument panel) 100 of the vehicle 200, and the on-board device 40 and the mobile information terminal 10 can, for example, be provided in the body (not shown) of the vehicle 200 via the top part 101 of the dashboard 100. Preferably, the on-board device 40 has a securing part 50 such as, for example, a suction cup or the like, and the on-board device is secured to the vehicle 200. The mobile information terminal 10 is preferably also secured to the vehicle 200, but does not absolutely need to be secured to the vehicle 200. As shown by the double-dashed lines in FIG. 2, the mobile information terminal 10 may be kept in, for example, a glove box in the front part 201 of the dashboard 100, and the user may hide the mobile information terminal 10 with such a method.

Figure 3:
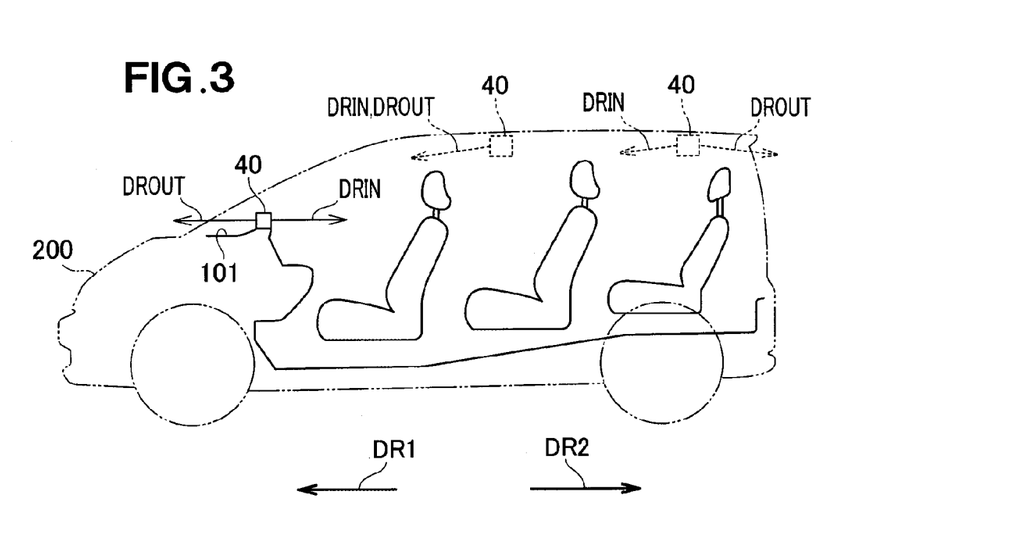
FIG. 3 shows an example of the placement of the on-board device of FIG. 1.

FIG. 3 is an example of the placement of the on-board device shown in FIG. 1. In the example shown in FIG. 3, the on-board device 40 is provided on the top part 101 of the dashboard 100. However, as shown by the single-dashed lines in FIG. 3, the on-board device 40 may be provided inside the passenger compartment of the vehicle, on the roof lining or the like. In this situation, the on-board device 40 and the mobile information terminal 10 provided on the roof lining may be provided on, for example, the door lining, a seat, or the like.

The camera unit 41 shown in FIG. 2 is capable of simultaneously photographing not only images in a passenger-compartment-inward direction DRIN but also images in a passenger-compartment-outward direction DROUT, and such a camera unit 41 has the merit of being able to acquire images of suspicious persons both outside and inside the passenger compartment. The passenger-compartment-outward direction DROUT, which is established by the on-board device 40 provided on the top part 101 of the dashboard 100 shown in FIG. 3, coincides with the front direction (forward direction) DR1 of the vehicle 200, and the passenger-compartment-inward direction DRIN coincides with the rear direction (reverse direction) DR2 of the vehicle 200. As shall be apparent, the passenger-compartment-outward direction DROUT and the passenger-compartment-inward direction DRIN, which are dependent on the location where the on-board device 40 is installed and are established by the on-board device 40 provided on the top part 101 of the dashboard 100, do not need to perfectly coincide with the front direction DR1 and rear direction DR2, respectively. The passenger-compartment-inward direction DRIN and passenger-compartment-outward direction DROUT shown by the single-dashed lines in FIG. 3 and established by the on-board device 40 provided behind the roof lining correspond respectively to the front direction DR1 and the rear direction DR2. The camera unit 41 shown in FIG. 2 has two imaging elements such as, for example, charge coupled device (CCD) array sensors, but images of the two directions (the passenger-compartment-outward direction DROUT and the passenger-compartment-inward direction DRIN) may be taken by a single imaging element such as, for example, a 360 degree camera (omnidirectional camera), or an image of one direction only may be taken. When the camera unit 41 acquires an image of one direction only, images of suspicious persons both outside and inside the passenger compartment can be acquired with images of the one direction depending on the location where the on-board device 40 is installed, as is the case with, for example, the on-board device 40 shown by the single-dashed lines of FIG. 3 and provided in the middle of the roof lining. Preferably, the camera unit 41 or the on-board device 40 has, for example, a clock and an illuminance sensor, and takes images in an infrared mode during the night.

Provided between the on-board device 40 and the mobile information terminal 10 shown in FIG. 2 are communication cables such as, for example, a universal serial bus (USB) cable and a high definition multimedia interface (HDMI (registered trademark)) cable, and the acquisition results of the acquisition units such as the camera unit 41 and the microphone unit 42 are supplied from the on-board device 40 to the mobile information terminal 10. The on-board device 40 and the mobile information terminal 10 herein are connected by a communication cable, but the on-board device 40 and the mobile information terminal 10 may be connected wirelessly; therefore, the acquisition results of the acquisition units such as the camera unit 41 and the microphone unit 42 may, for example, be supplied wirelessly from the on-board device 40 to the mobile information terminal 10. When the on-board device 40 and the mobile information terminal 10 are connected by a communication cable, power is preferably supplied from the mobile information terminal 10 to the on-board device 40 by this communication cable.

The mobile information terminal 10 shown in FIG. 1 can have a rechargeable battery unit 11, and the camera unit 41, the microphone unit 42, and the error detection unit 43 have power supplied thereto from the battery unit 11 and can operate thereby. The system or the on-board device 40 does not need to convert the on-board battery power source (e.g. 12 [V]) to the drive power sources (e.g. 5 [V]) of the camera unit 41, the microphone unit 42, the error detection unit 43, and the like, and the costs for producing the system are thereby reduced. In other words, a power source unit 45 of the on-board device 40 is configured from, for example, a power source connector and a power source terminal and does not need a transformer, and the power source unit 45 of the on-board device 40 can directly utilize the drive power source (e.g. 5 [V]) generated by the battery unit 11 of the mobile information terminal 10 and supplied from the battery unit 11.

The navigation device (another on-board device) 4 shown in FIG. 2 is supplied with an accessory power source that runs from the on-board battery power source through, for example, a relay switch, and the navigation device 4 generates drive voltage (e.g. 5 [V]) for the navigation device 4 from the on-board battery power source or the accessory power source (e.g. 12 [V]). In other words, a common on-board device such as the navigation device 4 cannot operate by utilizing power from the mobile information terminal 10.

The error detection unit 43 shown in FIG. 1 detects errors in the vehicle, and preferably can utilize not only the acquisition results of the camera unit 41 and the microphone unit 42, but also the acquisition results of a vibration sensor unit 44. In other words, preferably, the error detection unit 43 can determine whether or not an error has occurred in the vehicle on the basis of at least one of the following: an image from the camera unit 41, a sound from the microphone unit 42, and vibration from the vibration sensor unit 44. The vibration sensor unit 44 can be configured from, for example, a triaxial acceleration sensor, and can detect vibrations that accompany, for example, impact inflicted on the door by a suspicious person. The error detection unit 43 stores predetermined vibration patterns indicating such errors in, for example, a storage unit 48, and the error detection unit 43 can determine whether or not the vibration from the vibration sensor unit 44 coincides with a predetermined vibration pattern. Similarly, the error detection unit 43 can store, for example, the faces of the driver and of their family in, for example, the storage unit 48, and the error detection unit 43 can determine whether or not the image from the camera unit 41 coincides with a predetermined image pattern that does not indicate an error. The error detection unit 43 can also store, for example, the faces of the driver and of his or her family in, for example, the storage unit 48, and the error detection unit 43 can determine whether or not the image from the camera unit 41 coincides with a predetermined sound pattern that does not indicate an error.

Thus, when the error detection unit 43 detects an error in the vehicle 200 (or the cause of the error), the error detection unit 43 can store the image and sound corresponding to the error in the storage unit 48. The error detection unit 43 can store the image and sound in the storage unit 48 during, for example, a predetermined time period (a first predetermined time period) from a time t1 (or immediately before the time t1) at which the error is detected by the vibration sensor unit 44. The image stored in the storage unit 48 may be a video of the predetermined time period (the first predetermined time period), or, for example, a series of still images acquired during a 30 second interval from the time t1. The video is stored in the storage unit 48 as an electronic file in a compressed format such as, for example, that of the Moving Picture Experts Group (MPEG), and the still images are stored in the storage unit 48 as electronic files in a compressed format such as, for example, that of the Joint Photographic Experts Group (JPEG). Similarly, sounds are stored in the storage unit 48 as, for example, electronic files in a compressed format. As shall be apparent, the electronic files of videos, still images, and sounds stored in the storage unit 48 may be in an uncompressed format.

The storage unit 48 of the on-board device 40 is configured from, for example, rewriteable nonvolatile memory.

The storage unit 48 shown in FIG. 2 may also store electronic files such as videos, still images, and sounds in removable storage media 49.

The error detection unit 43 of the on-board device 40 shown in FIG. 1 can start up an email application of the mobile information terminal 10. In other words, a processor 17 of the mobile information terminal 10 is capable of starting up an email application stored in a storage unit 16 configured from, for example, a hard disk drive (HDD), and the processor 17 or email application is externally operated by the error detection unit 43. The email application can attach, for example, electronic files of videos, still images, and sounds stored in the storage unit 48 as triggers with the errors in the vehicle 200 to email, and such email is sent to the user's email address. Data such as externally operated data and electronic data is sent from the on-board device 40 to the mobile information terminal 10 by a communication unit 46 having, for example, a USB communication module, and this data from the on-board device 40 is received in the mobile information terminal 10 by a communication unit 13 having, for example, a USB communication module.

When the error detection unit 43 has detected an error in the vehicle 200, the error detection unit 43 can send, for example, an electronic file containing a still image acquired by the camera unit 41 and an electronic file containing a sound acquired by the microphone unit 42 to outside the vehicle 200 in conjunction with the mobile information terminal 10 provided in the vehicle 200. Specifically, with the communication unit 13 which also has, for example, a 3G communication module that can be connected to a mobile telephone network and a mobile telephone communication module such as a long term evolution (LTE) communication module, the externally operated email application can send an email with an attached electronic file to the mobile telephone network (and the internet line connected to the mobile telephone network). The error detection unit 43, which can also be called a processor, is configured from, for example, a central processing unit (CPU), and, for example, an error detection application is stored in the storage unit 48. Running the error detection application can determine whether or not an error in the vehicle has occurred on the basis of at least one of the following: an image from the camera unit 41, a sound from the microphone unit 42, and vibration from the vibration sensor unit 44; and the email application can be externally operated.

The mobile information terminal 70 shown in FIG. 1, to which the user's email address is assigned, has an email application stored in a storage unit 76 configured from, for example, an HDD, and email sent from the mobile information terminal 10 can be received by a communication unit 73 having, for example, a 3G communication module. The mobile information terminal 70 may also have, for example, a telephone application, and a processor 77 configured from, for example, a CPU can run applications such as an email application and a telephone application. The user can, while outside the vehicle, recreate the electronic file attached to the email and can observe the vehicle 200. The mobile information terminal 70 comprises a display unit 72 configured from, for example, a liquid crystal panel, and the display unit 72 can display the images acquired by the camera unit 41. The mobile information terminal 70 may have a speaker unit (not shown) similar to a speaker unit 14 of the mobile information terminal 10, and this speaker unit may recreate the electronic file attached to the email. When the contents of the electronic file give the face, voice, and other characteristics of a suspicious person, the user can be made aware that the vehicle 200 has been stolen and can notify, for example, the police, a security company, or the like. Otherwise, the user may call the telephone number of the mobile information terminal 10 with the telephone number of the mobile information terminal 70 and issue an audio warning, such as "You are being photographed. Do not steal my car!" into a microphone unit 78 of the mobile information terminal 70, and this audio may be recreated by the speaker unit 14 controlled by the telephone application of the mobile information terminal 10 provided in the vehicle 200. The mobile information terminal 70 monitoring the vehicle 200 is preferably portable, but may also be an information terminal such as a desktop computer.

The error detection unit 43 not only externally operates the email application and telephone application of the mobile information terminal 10, but may also externally operate a battery application or the like of the mobile information terminal 10. These applications may be constructed from a single integrated application. The battery application can supply the on-board device 40 with power from the battery unit 11 of the mobile information terminal 10 via, for example, a USB cable. The battery unit 11 of the mobile information terminal 10 can have, for example, a+ terminal (positive electrode) and a− terminal (negative electrode) as well as a communication terminal (gauge), and the battery application can measure or monitor the remaining life (expressed as a percentage) of the battery unit 11 from the communication terminal of the battery unit 11.

The acquisition units such as the camera unit 41, the error detection unit 43, other components can be operated by the power from the mobile information terminal 10, and the error detection unit 43 can receive the remaining life (expressed as a percentage) of the battery unit 11 via the communication unit 46. This type of error detection unit 43 can change the mode in which errors in the vehicle 200 are detected in accordance with the state of the battery unit 11. The error detection unit 43 can thereby continue to detect errors for a long time when, for example, the battery unit 11 has little remaining life. Specifically, when the remaining life (expressed as a percentage) of the battery unit 11 is a predetermined value (a first predetermined value) or less, the error detection unit 43 can stop the supply of power to the acquisition units and other components such as the camera unit 41, and can implement a sleep mode. This type of error detection unit 43 continues the supply of power to the vibration sensor unit 44, and when, for example, vibration of a predetermined value (a second predetermined value) or greater is detected by the vibration sensor unit 44, the error detection unit 43 can restart the supply of power to the sleeping acquisition units and other components such as the camera unit 41, and can wake up, for example, the camera unit 41 and the microphone unit 42 at the detection of vibration by the vibration sensor unit 44.

Thus, when the remaining life (expressed as a percentage) of the battery unit 11 is not equal to or less than the predetermined value (the first predetermined value), the error detection unit 43 can determine whether or not an error has occurred in the vehicle 200 on the basis of, for example, an image from the camera unit 41, a sound from the microphone unit 42, and vibration from the vibration sensor unit 44 (a first mode). When the remaining life (expressed as a percentage) of the battery unit 11 is equal to or less than the predetermined value (the first predetermined value), the error detection unit 43 can determine whether or not an error has occurred in the vehicle 200 on the basis of, for example, vibration from the vibration sensor unit 44 (a second mode). After an error in the vehicle 200 has been detected in the second mode, the error detection unit 43 can determine whether or not an error has occurred in the vehicle on the basis of at least one of the following, for example: an image from the camera unit 41, a sound from the microphone unit 42, and vibration from the vibration sensor unit 44.

The mobile information terminal 10 shown in FIG. 1 can have a global positioning system (GPS) unit 15 and a GPS application. After an error in the vehicle 200 has been detected, the error detection unit 43 can externally operate the GPS application and can send position information acquired by the GPS unit 15 from the communication unit 13 of the mobile information terminal 10 to outside the vehicle 200 (to the mobile information terminal 70 or the like). When, for example, the vehicle 200 is moved by a tow truck, the system or the on-board device 40 can utilize the GPS unit 15 of the mobile information terminal 10 provided in the vehicle 200 to track the vehicle 200 or the tow truck.

The on-board device 40 or the error detection unit 43 can detect a connection with the mobile information terminal 10, and after a connection between the mobile information terminal 10 and the error detection unit 43 has been established, the error detection unit 43 can begin to detect errors in the vehicle 200. Otherwise, the on-board device 40 can comprise a display unit 47 (operating unit) configured from, for example, a touch panel-type liquid crystal panel, the display unit 47 displays, for example, software buttons on the display unit 47, and after a "begin monitoring" button which is a software button is pressed by the user, the error detection unit 43 can being detecting errors in the vehicle 200. Similarly, after the connection between the mobile information terminal 10 and the error detection unit 43 has been terminated, the error detection unit 43 can stop detecting errors in the vehicle 200.

Otherwise, the display unit 47 displays, for example, a software button ("stop monitoring") on the display unit 47 while a connection between the mobile information terminal 10 and the error detection unit 43 is established, and detection of errors in the vehicle 200 can be stopped after the "stop monitoring" button which is a software button is pressed by the user. The mobile information terminal 10 can comprise a display unit 12 configured from, for example, a touch panel-type liquid crystal panel, and the display unit 47 of the mobile information terminal 10 may display software buttons such as a "being monitoring" button and a "stop monitoring" button.

Figure 4:
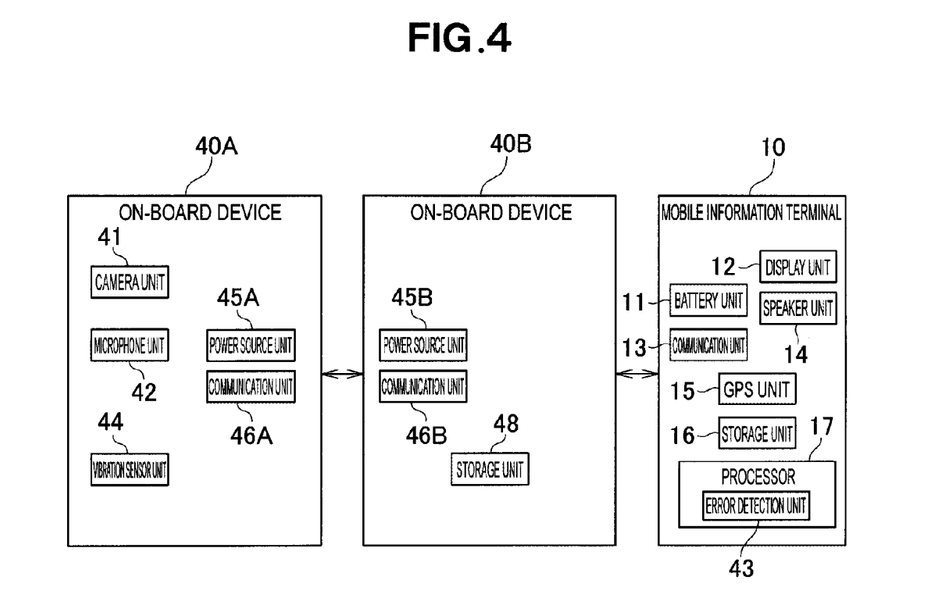
FIG. 4 shows another example configuration of the system according to the present invention.

FIG. 4 shows another example of the configuration of a system according to the present invention. The on-board device 40 shown in FIG. 1 is configured from the two on-board devices 40A, 40B shown in FIG. 4. The on-board device 40 shown in FIG. 1 may thus be configured from a plurality of implements. In other words, the – board device 40 shown in FIG. 1 may be separate from, for example, the camera unit 41, the microphone unit 42, and the vibration sensor unit 44. As shall be apparent, the on-board device 40A shown in FIG. 4 may be separate from, for example, the microphone unit 42 and the vibration sensor unit 44, and the on-board device 40B shown in FIG. 4 may have, for example, the vibration sensor unit 44.

The error detection unit 43 may be excluded from both of the two on-board devices 40A, 40B shown in FIG. 4. In other words, the two on-board devices 40A, 40B can operate as external connecting implements of the mobile information terminal 10, and the processor 17 of the mobile information terminal 10 can have the function of the error detection unit 43. For example, a battery application (the error detection unit 43) of the mobile information terminal 10 can determine whether or not an error has occurred in the vehicle 200 on the basis of, for example, an image from the camera unit 41, a sound from the microphone unit 42, and vibration from the vibration sensor unit 44, power from the battery unit 11 can be supplied to the on-board device 40B, and the on-board device 40B can supply some of this power to the on-board device 40A. As shall be apparent, the error detection unit 43 may be excluded from the on-board device 40 of FIG. 1, and the processor 17 of the mobile information terminal 10 in FIG. 1 may have the function of the error detection unit 43.

Figure 5:
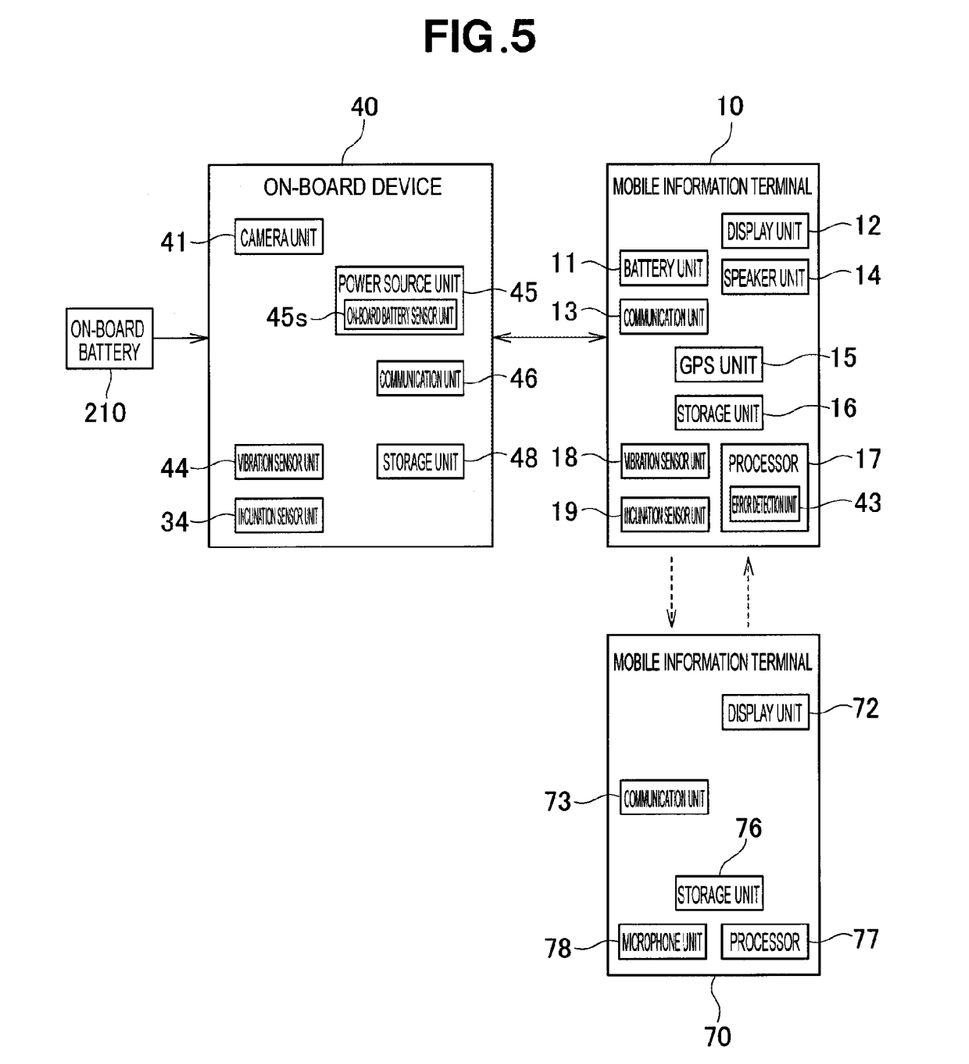
FIG. 5 shows a further example configuration of the system according to the present invention.

FIG. 5 shows another example of the configuration of the system according to the present invention. The on-board device 40 shown in FIG. 5 can further comprise an inclination sensor unit 34, and the mobile information terminal 10 shown in FIG. 5 can further comprise a vibration sensor unit 18 and an inclination sensor unit 19. The inclination sensor unit 34 and the inclination sensor unit 19 provided in the vehicle 200 can both detect the inclination of the vehicle 200. The vibration sensor unit 44 and the vibration sensor unit 18 provided in the vehicle 200 can both detect vibration in the vehicle 200. For example, the error detection unit 43 of FIG. 5 provided to the mobile information terminal 10 can utilize not only the acquisition results of the vibration sensor unit 44 and the vibration sensor unit 18 of the mobile information terminal 10, but also the acquisition results of the inclination sensor unit 19 and the inclination sensor unit 34 of the on-board device 40. In other words, preferably, the error detection unit 43 not only synchronizes the vibration sensor unit 44 with the vibration sensor unit 18, but can also synchronize the inclination sensor unit 34 with the inclination sensor unit 19.

When the on-board device 40 shown in FIG. 5 does not comprise, for example, the vibration sensor unit 44, the error detection unit 43 may synchronize the inclination sensor unit 34 alone with the inclination sensor unit 19. Alternatively, when the on-board device 40 and the mobile information terminal 10 shown in FIG. 5 respectively comprise, for example, the microphone unit 42 shown in FIG. 1 and an unillustrated microphone unit, the error detection unit 43 may synchronize the microphone unit 42 with the microphone unit of the mobile information terminal 10.

The error detection unit 43 can analyze errors in the vehicle in detail because, for example, a sensor unit such as the vibration sensor unit 44 is synchronized with a sensor unit such as the vibration sensor unit 18. In other words, the error detection unit 43 can more accurately determine whether or not an error has occurred in the vehicle 200.

An on-board battery 210 shown in FIG. 5 is connected to, for example, the on-board device 40, and the on-board device 40 or the power source unit 45 can convert the on-board battery power source or accessory power source (e.g. 12 [V]) from the on-board battery 210 to the drive voltage (e.g. 5 [V]) of the on-board device 40. The on-board device 40 or the power source unit 45 shown in FIG. 5 can utilize the power from the on-board battery 210 to recharge the battery unit 11 of the mobile information terminal 10. Additionally, the on-board device 40 or the power source unit 45 shown in FIG. 5 can comprise an on-board battery sensor unit 45S, and the error detection unit 43 may utilize power from the battery unit 11 in accordance with the state of the on-board battery 210.

Figure 6:
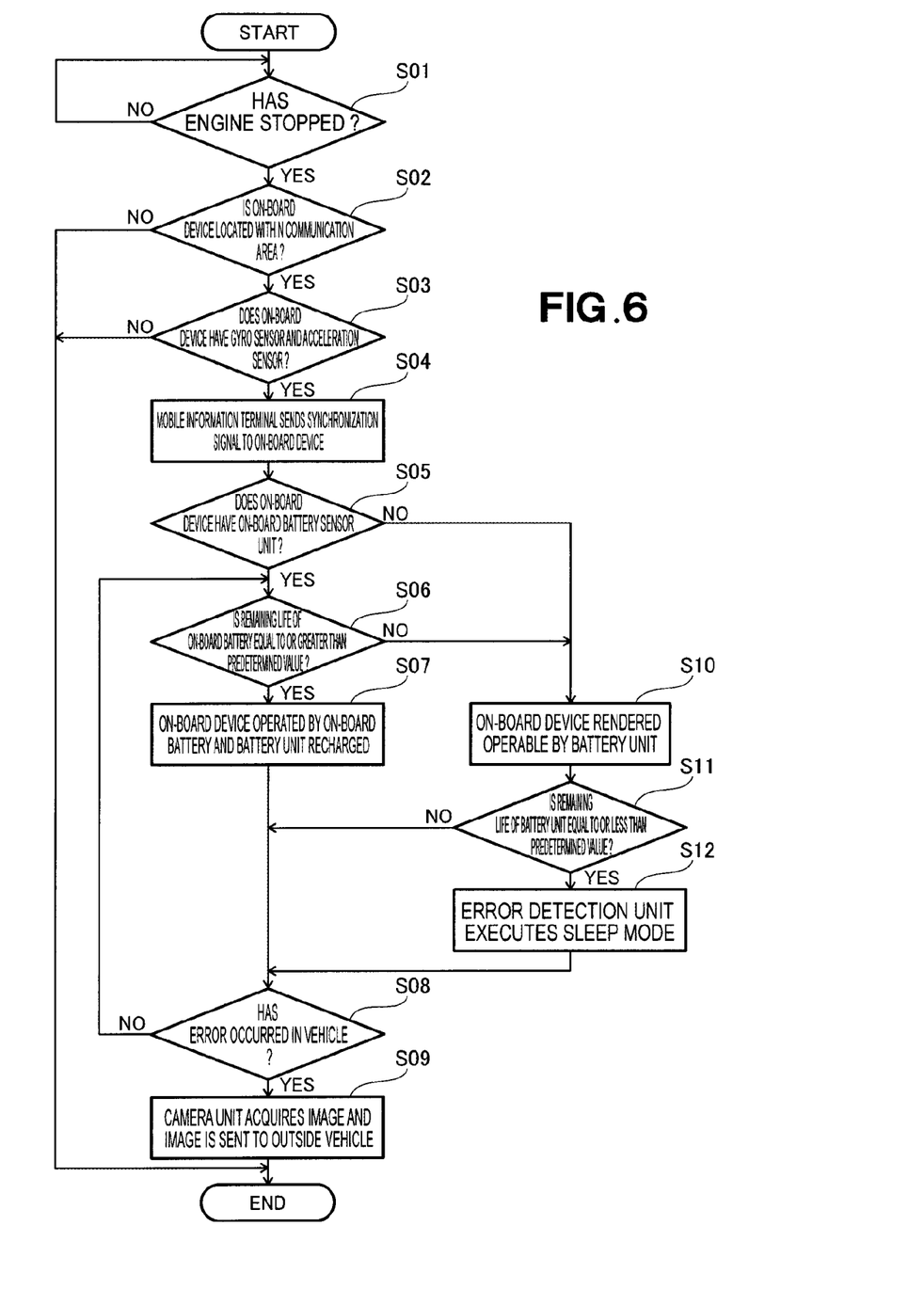
FIG. 6 is a flowchart illustrating an example action of the system of FIG. 5.

FIG. 6 shows a flowchart depicting an example of the actions of the system shown in FIG. 5. The processor 17 or the error detection unit 43 can determine whether or not the drive unit (e.g. the engine) of the vehicle 200 has stopped (step S01). The processor 17 or the error detection unit 43 can utilize the vibration sensor unit 18 configured from, for example, a triaxial acceleration sensor, and can detect vibration that accompanies, for example, the vibration of the engine. Specifically, the error detection unit 43 can determine whether or not vibration from the vibration sensor unit 18 is repeating a predetermined vibration pattern representing the operation of the engine. The processor 17 or the error detection unit 43 may utilize the vibration sensor unit 18 configured from, for example, a triaxial acceleration sensor, and may determine whether or not the speed of the vehicle 200 continues to be zero for, for example, a predetermined time period (a second predetermined time period).

The processor 17 or the error detection unit 43 may also determine whether or not the power source (drive voltage) from the on-board device 40 or the power source unit 45 is being supplied to the mobile information terminal 10 or the battery unit 11. When a starter button (not shown) such as, for example, an ignition switch is turned off in order to stop the engine, a, for example, relay switch is turned off, and the on-board device 40 or the power source unit 45 therefore cannot supply the drive voltage (e.g. 5 [V]) generated from the accessory power source to the mobile information terminal 10 or the battery unit 11. The processor 17 or the error detection unit 43 may in this manner determine whether or not the, for example, engine of the vehicle 200 has stopped (step S01).

When the, for example, engine of the vehicle 200 has stopped, the processor 17 or the error detection unit 43 can determine whether or not the on-board device 40 is located within a communication area of a wireless communication module such as, for example, a Wireless Fidelity (Wi-Fi) communication module or a Bluetooth (registered trademark) communication module (step S02). Specifically, when both the communication unit 46 and the communication unit 13 have a wireless communication module, the processor 17 or the error detection unit 43 can determine whether or not wireless communication is established between the communication unit 46 and the communication unit 13.

When the on-board device 40 is located within a communication area, the processor 17 or the error detection unit 43 can determine whether or not the on-board device 40 has an inclination sensor unit 34 (e.g. a biaxial gyro sensor) and a vibration sensor unit 44 (e.g. a triaxial acceleration sensor) (step S03). Next, when the on-board device 40 has, for example, a gyro sensor and, for example, an acceleration sensor, the processor 17 or the error detection unit 43 can send synchronization signal to the on-board device 40 (step S04). Because a synchronization signal is sent from the mobile information terminal 10 to the on-board device 40, the time of the on-board device 40 can be synchronized with the time of the mobile information terminal 10, and both the, for example, gyro sensor of the on-board device 40 and the, for example, gyro sensor (inclination sensor unit 19) of the mobile information terminal 10 can detect the inclination of the vehicle 200 with the same timing. Similarly, both the, for example, gyro sensor of the on-board device 40 and the, for example, gyro sensor of the mobile information terminal 10 can detect vibration in the vehicle 200 with the same timing.

Additionally, the processor 17 or the error detection unit 43 can determine whether or not the on-board device 40 has an on-board battery sensor unit 45S (e.g. a voltmeter) (step S05). Next, when the on-board device 40 has an on-board battery sensor unit 45, the processor 17 or the error detection unit 43 can determine whether or not the remaining life of the on-board battery 210 is a predetermined value (a third predetermined value) or greater (step S06). The predetermined value (the third predetermined value) herein is preferably set higher than the remaining life at which the engine can be started up. A, for example, voltmeter can measure the voltage of an on-board battery power source or an accessory power source, which shows the remaining life of the on-board battery 210, and can send or output the voltage or the remaining life to the mobile information terminal 10.

When the remaining life of the on-board battery 210 is the predetermined value (the third predetermined value) or greater, the on-board device 40 can convert the on-board battery power source or the accessory power source to the drive voltage of the on-board device 40. The on-board device 40 can be operated by this drive voltage (i.e. the on-board battery 210), and can output this drive voltage to the mobile information terminal 10 through a communication cable such as a USB cable (step S07). Specifically, when the communication unit 46 and the communication unit 13 both have a power feed module such as, for example, a USB communication module, the, for example, USB communication module of the on-board device 40 functions as a host and outputs the drive voltage to the, for example, USB communication module of the mobile information terminal 10, and the processor 17 or the error detection unit 43 can accordingly recharge the battery unit 11 with the inputted drive voltage (i.e. the on-board battery 210).

Next, the processor 17 or the error detection unit 43 can determine whether or not an error has occurred in the vehicle 200 through, for example, the vibration sensor unit 44, the vibration sensor unit 18, the inclination sensor unit 34, and the inclination sensor unit 19 (step S08). Specifically, when at least one unit among the vibration sensor unit 44, the vibration sensor unit 18, the inclination sensor unit 34, and the inclination sensor unit 19 detects an error in the vehicle 200, it is then determined whether or not any of the remaining units among the vibration sensor unit 44, the vibration sensor unit 18, the inclination sensor unit 34, and the inclination sensor unit 19 have detected an error in the vehicle 200 within, for example, a predetermined time period (a third predetermined time period).

Because, for example, the vibration sensor unit 44 is synchronized with the vibration sensor unit 18, the error detection unit 43 can analyze errors in the vehicle in detail. Specifically, the error detection unit 43 can determine how far, at what speed, and in which direction, both the vibration sensor unit 44 and the vibration sensor unit 18 have become displaced. Therefore, the error detection unit 43 can analyze if vibration is coming from the front direction or rear direction of the vehicle 200, or if vibration is coming from the right direction or left direction of the vehicle 200.

Because, for example, the inclination sensor unit 34 is synchronized with the inclination sensor unit 19, the error detection unit 43 can analyze errors in the vehicle in detail. Specifically, the error detection unit 43 can determine the weight of the person entering the vehicle and the direction from which they enter. Therefore, the error detection unit 43 can analyze if the original direction of inclination of the vehicle 200 coincides with the original direction of vibration, and if a person weight, for example, 30 [kg] or more has entered the vehicle 200.

Thus, the processor 17 or the error detection unit 43 can more accurately determine whether or not an error has occurred in the vehicle 200. In other words, erroneous operations of the error detection unit 43 are avoided or reduced.

Figure 7:
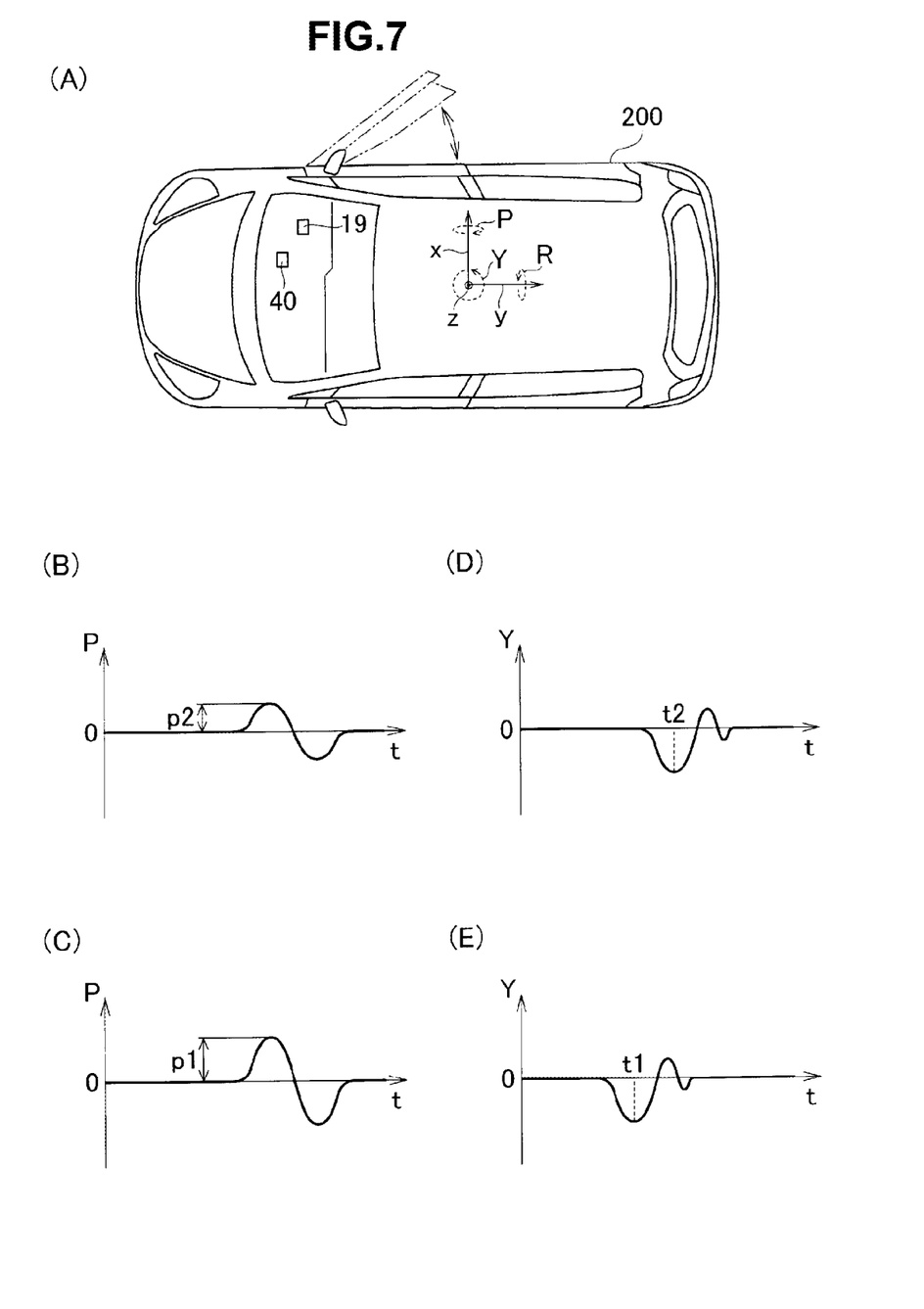

FIG. 7(A) shows an example of the placement of the on-board device 40 and the mobile information terminal 10 shown in FIG. 5, FIGS. 7(B) and (C) show an example of the output of the gyro sensor of the on-board device 40 and the mobile information terminal 10, respectively, about one x-axis, and FIGS. 7(D) and (E) show an example of the output of the gyro sensor of the on-board device 40 and the mobile information terminal 10, respectively, about another z-axis.

As shown in the plan view in FIG. 7(A), one x-axis is oriented in, for example, the right direction of the vehicle 200, another z-axis is oriented in, for example, the up direction of the vehicle 200, and another y-axis is oriented in, for example, the rear direction of the vehicle 200. The x- and y-axis coordinates of the on-board device 40 shown in FIG. 7(A) are different from the x- and y-axis coordinates of the mobile information terminal 10. The z-axis coordinate of the on-board device 40 may be different from the z-axis coordinate of the mobile information terminal 10.

When, for example, the driver-side door of the vehicle 200 is wrongfully opened by a suspicious person and the suspicious person sits in the driver seat, the gyro sensor (the inclination sensor unit 19) of the mobile information terminal 10 detects the inclination P (the pitch angle) about the x-axis (see FIG. 7(C)). Similarly, the gyro sensor (the inclination sensor unit 34) of the on-board device 40 also detects the inclination P about the x-axis (see FIG. 7(B)). Because the distance between the gyro sensor of the mobile information terminal 10 and the driver-side door is shorter than the distance between the gyro sensor of the on-board device 40 and the driver-side door, the amplitude P1 of the inclination P about the x-axis detected by the gyro sensor of the mobile information terminal 10 is greater than the amplitude P2 of the inclination P about the x-axis detected by the gyro sensor of the on-board device 40. Therefore, the mobile information terminal 10 or the error detection unit 43 can determine that a suspicious person has entered the vehicle 200 from the right direction of the vehicle 200.

Similarly, the gyro sensors of the mobile information terminal 10 and the on-board device 40 detect the inclination Y (yaw angle) about the z-axis (see FIGS. 7(E) and 7(D)). Because the distance between the gyro sensor of the mobile information terminal 10 and the driver-side door is shorter than the distance between the gyro sensor of the on-board device 40 and the driver-side door, the time t1 of the maximum amplitude of the inclination Y about the z-axis detected by the gyro sensor of the mobile information terminal 10 occurs sooner than the time t2 of the maximum amplitude of the inclination Y about the z-axis detected by the gyro sensor of the on-board device 40. Therefore, the mobile information terminal 10 or the error detection unit 43 can determine that a suspicious person has entered the vehicle 200 from the right direction of the vehicle 200. The error detection unit 43 may detect an error in the vehicle 200 at time t1, but preferably can detect an error in the vehicle 200 at time t2. The error detection unit 43 can more accurately determine whether or not an error in the vehicle 200 has occurred by confirming that, for example, the waveform of the inclination Y about the z-axis is delayed by, for example, an amount equal to time t2−t1.

When it has been determined in step S08 shown in FIG. 6 that an error has occurred in the vehicle 200, the processor 17 or the error detection unit 43 externally operates the camera unit 41 of the on-board device 40, and the camera unit 41 thereby acquires an image (step S09). As shall be apparent, when, for example, vibration in the vehicle 200 has been detected before it is determined that an error in the vehicle 200 has occurred, the processor 17 or the error detection unit 43 may externally operate the camera unit 41 of the on-board device 40. The camera unit 41 continues to acquire images for, for example, a predetermined time period (a first predetermined time period), and sends such images to the mobile information terminal 10 via, for example, a wireless communication module (the communication units 46, 13). Next, the mobile information terminal 10 forwards such images to the mobile information terminal 70 via, for example, a mobile telephone communication module (the communication units 13, 73). The acquisition results (images) from, for example, the camera unit 41 are thereby sent to outside the vehicle 200 (step S09). The user of the mobile information terminal 70 can monitor the vehicle 200 him or herself via the acquisition results from, for example, the camera unit 41.

When the on-board device 40 is not located within a communication area in step S02 shown in FIG. 6, or when the on-board device 40 does not have a gyro sensor or an acceleration sensor in step S03, the processor 17 or the error detection unit 43 does not detect an error in the vehicle 200. Therefore, the mobile information terminal 10 may be rendered inoperable. In other words, the mobile information terminal 10 may turn off the power source of the mobile information terminal 10. Similarly, the on-board device 40 may be rendered inoperable. When the sensor unit of the on-board device 40 is not synchronized with the sensor unit of the mobile information terminal 10, the processor 17 or the error detection unit 43 need not detect an error in the vehicle 200. Specifically, the error detection unit 43 may utilize, for example, a single sensor alone to detect an error in the vehicle 200.

When the on-board device 40 does not have an on-board battery sensor unit 45S in step S05 shown in FIG. 6, or when the remaining life of the on-board battery 210 is not equal to or greater than a predetermined value (the third predetermined value) in step S06, the on-board device 40 is rendered operable by the battery unit 11 of the mobile information terminal 10 (step S10). Specifically, the processor 17 or the error detection unit 43 can stop the output of drive voltage by stopping the conversion to drive voltage from the on-board battery power source or the accessory power source. In other words, for example, the USB communication module of the on-board device 40 functions as the slave while, e.g., the USB communication module of the mobile information terminal 10 functions as the host. Therefore, the power from the battery unit 11 of the mobile information terminal 10 is supplied to the on-board device 40, and, e.g., the camera unit 41 is rendered operable.

Next, the processor 17 or the error detection unit 43 can determine whether or not the remaining life of the battery unit 11 is equal to or less than a predetermined value (the first predetermined value) (step S11). When the remaining life of the battery unit 11 is equal to or less than a predetermined value (the first predetermined value), e.g., 30 [%], the processor 17 or the error detection unit 43 can execute sleep mode (step S12). Specifically, when the error detection unit 43 stops the supply of power to, for example, the camera unit 41 and vibration equal to or greater than, for example, a predetermined value (the second predetermined value) is detected by, for example, the vibration sensor unit 18, the error detection unit 43 can restart the supply of power to the sleeping camera unit 41 and can, for example, wake up the camera unit 41. The processor 17 or the error detection unit 43 may omit step S11 and constantly execute sleep mode.

The present invention is not limited to the exemplary embodiments described above; a person skilled in the art could easily make changes to the exemplary embodiments described above within a range included in the patent claims.

KEY TO SYMBOLS

4: navigation device, 10: mobile information terminal, 11: battery unit, 12: display unit, 13: communication unit, 14:

speaker unit, 15: GPS unit, 16: storage unit, 17: processor (error detection unit), 18: vibration sensor unit, 19, 34: inclination sensor units, 40, 40A, 40B: on-board devices, 41: camera unit (acquisition unit), 42: microphone unit (acquisition unit), 43: error detection unit, 44: vibration sensor unit, 45, 45A, 45B: power source units, 45S: on-board battery sensor unit, 46, 46A, 46B: communication units, 47: display unit, 48: storage unit, 49: storage media, 50: securing part, 70: mobile information terminal, 72: display unit, 73: communication unit, 76: storage unit, 77; processor, 78: microphone unit, 100: dashboard, 101: top part, 102: front part, DR1: front direction, DR2: rear direction, DRIN: passenger-compartment-inward direction, DROUT: passenger-compartment-outward direction, 200: vehicle, 210: on-board battery

The invention claimed is:

1. A vehicle monitoring system comprising:
   an acquisition unit provided in a vehicle, said acquisition unit configured to acquire at least one of images or sounds; and
   an error detection unit provided in the vehicle, said error detection unit configured to detect errors in the vehicle,
   when the error detection unit has detected an error, acquisition results output from the acquisition unit are sent outside the vehicle via a mobile information terminal provided in the vehicle,
   the mobile information terminal comprises a rechargeable battery unit, and the acquisition unit, of an on-board device, is powered by the rechargeable battery unit of the mobile information terminal,
   the mobile information terminal is configured to change an error detection mode of the error detection unit in accordance with a state of the rechargeable battery unit in the mobile information terminal,
   a power source unit of the on-board device is configured to recharge the rechargeable battery unit by using power from an on-board battery, and
   the power source unit of the on-board device is also powered by the on-board battery in accordance with a state of the on-board battery.

2. The system of claim 1, the error detection unit is powered by the rechargeable battery unit of the mobile information terminal, and the acquisition unit and the error detection unit are allowed to operate.

3. The system of claim 2, the error detection unit is powered by the on-board battery in accordance with the state of the on-board battery, and the acquisition unit and the error detection unit are allowed to operate.

4. The system of claim 1, the error detection unit is configured to synchronize a sensor unit of the mobile information terminal with a sensor unit of the on-board device to detect the errors.

5. The system of claim 1, further comprising the mobile information terminal.

6. The system of claim 1, further comprising a mobile information terminal for receiving the acquisition results sent from the mobile information terminal.

7. The system of claim 1, the rechargeable battery unit can be recharged by using power from the on-board battery.

8. The system of claim 2, the error detection unit is configured to synchronize a sensor unit of the mobile information terminal with a sensor unit of the on-board device to detect the errors.

9. The system of claim 3, the error detection unit is configured to synchronize a sensor unit of the mobile information terminal with a sensor unit of the on-board device to detect the errors.

10. The system of claim 2, further comprising the mobile information terminal.

11. The system of claim 3, further comprising the mobile information terminal.

12. The system of claim 4, further comprising the mobile information terminal.

13. The system of claim 2, further comprising a mobile information terminal for receiving the acquisition results sent from the mobile information terminal.

14. The system of claim 1, when a remaining life of the battery unit is equal to or less than a predetermined value, the error detection unit is configured to stop a supply of power to the acquisition units and at least one of a camera unit or a microphone unit, and can implement a sleep mode.

15. The system of claim 14, when the remaining life of the battery unit is equal to or less than the predetermined value, the error detection unit is configured to supply power to a vibration sensor unit of the acquisition unit,
   and when, a predetermined value or greater is detected by the vibration sensor unit, the error detection unit is configured to restart the supply of power to the sleeping acquisition units and the camera unit and is configured to wake up at least one of the camera unit and the microphone unit at the detection of vibration by the vibration sensor unit.

16. The system of claim 1, after a connection between the mobile information terminal and the error detection unit is established, the error detection unit is configured to detect the errors in the vehicle.

17. The system of claim 16, after the connection between the mobile information terminal and the error detection unit is terminated, the error detection unit is configured to stop detecting the errors in the vehicle.

* * * * *